US008185759B1

(12) United States Patent
Li et al.

(10) Patent No.: US 8,185,759 B1
(45) Date of Patent: May 22, 2012

(54) METHODS AND SYSTEMS FOR INTERFACING BUS POWERED DEVICES WITH HOST DEVICES PROVIDING LIMITED POWER LEVELS

(75) Inventors: Qing Yun Li, San Diego, CA (US); Christopher Thomas, San Diego, CA (US)

(73) Assignee: SMSC Holdings S.a.r.l., Luxembourg (LU)

( * ) Notice: Subject to any disclaimer, the term of this patent is extended or adjusted under 35 U.S.C. 154(b) by 497 days.

(21) Appl. No.: 12/266,335

(22) Filed: Nov. 6, 2008

(51) Int. Cl.
*G06F 1/00* (2006.01)
(52) U.S. Cl. ........................ 713/310; 710/305
(58) Field of Classification Search .......... 713/300–340; 710/305–306
See application file for complete search history.

(56) References Cited

U.S. PATENT DOCUMENTS

| | | | |
|---|---|---|---|
| 4,390,964 A | 6/1983 | Horky et al. |
| 5,541,985 A | 7/1996 | Ishii et al. |
| 5,630,081 A | 5/1997 | Rybicki et al. |
| 5,786,769 A | 7/1998 | Coteus et al. |
| 5,815,426 A | 9/1998 | Jigour et al. |
| 5,841,654 A | 11/1998 | Verissimo et al. |
| 5,848,298 A | 12/1998 | Steere, Jr. et al. |
| 5,877,483 A | 3/1999 | Bilich et al. |
| 5,884,086 A | 3/1999 | Amoni et al. |
| 6,000,607 A | 12/1999 | Ohki et al. |
| 6,012,103 A | 1/2000 | Sartore et al. |
| 6,168,077 B1 | 1/2001 | Gray et al. |
| 6,184,652 B1 | 2/2001 | Yang |
| 6,230,277 B1 | 5/2001 | Nakaoka et al. |
| 6,253,329 B1 | 6/2001 | Kang |
| 6,308,239 B1 | 10/2001 | Osakada et al. |
| 6,349,878 B2 | 2/2002 | Imai |
| 6,405,362 B1 | 6/2002 | Shih et al. |
| 6,438,638 B1 | 8/2002 | Jones et al. |
| 6,460,106 B1 | 10/2002 | Stufflebeam |
| 6,460,143 B1 | 10/2002 | Howard et al. |
| 6,507,172 B2 | 1/2003 | Sherman |
| 6,531,845 B2 | 3/2003 | Kerai et al. |
| 6,532,512 B1 | 3/2003 | Torii et al. |
| 6,541,879 B1 | 4/2003 | Wright |

(Continued)

FOREIGN PATENT DOCUMENTS

EP 693723 1/1996

(Continued)

OTHER PUBLICATIONS

Compaq, et al., "Universal Serial Bus Specification: Revision 2.0" Apr. 27, 2000, pp. 171-177.

(Continued)

*Primary Examiner* — Brian Misiura
*Assistant Examiner* — Kim Huynh

(57) ABSTRACT

Various techniques are provided for interfacing external devices with host computer systems. In one example, hard drive parameters may be retrieved from a nonvolatile memory of an external hard drive enclosure device in order to register the external device with a host device while the host device provides a low power level to the external device. Following registration of the external device, the host device may provide a high power level to the external device to operate the registered external device. The hard drive parameters may be stored in the nonvolatile memory by a provider of the external device. In another example, the hard drive parameters may be loaded into the nonvolatile memory by appropriate software running on the host device. In yet another example, the external device may read the hard drive parameters from the hard drive while emulating another external device.

29 Claims, 3 Drawing Sheets

U.S. PATENT DOCUMENTS

| | | | |
|---|---|---|---|
| 6,557,754 B2 | 5/2003 | Gray et al. | |
| 6,598,100 B2 | 7/2003 | Shu et al. | |
| 6,622,195 B2 | 9/2003 | Osakada et al. | |
| 6,654,841 B2 | 11/2003 | Lin | |
| 6,662,258 B1 | 12/2003 | Lukanc et al. | |
| 6,665,801 B1 | 12/2003 | Weiss | |
| 6,681,991 B1 | 1/2004 | Li | |
| 6,714,215 B1 | 3/2004 | Flora et al. | |
| 6,732,218 B2 | 5/2004 | Overtoom et al. | |
| 6,738,068 B2 | 5/2004 | Cohen et al. | |
| 6,798,173 B2 | 9/2004 | Hsu | |
| 6,804,740 B1 | 10/2004 | Watts, Jr. | |
| 6,910,627 B1 | 6/2005 | Simpson-Young et al. | |
| 6,928,562 B2 | 8/2005 | Cohen et al. | |
| 6,945,454 B2 | 9/2005 | Tournemille et al. | |
| 6,946,817 B2 | 9/2005 | Fischer et al. | |
| 6,990,549 B2 | 1/2006 | Main et al. | |
| 7,017,055 B1 | 3/2006 | Ho | |
| 7,024,569 B1 | 4/2006 | Wright et al. | |
| 7,039,727 B2 | 5/2006 | Camara et al. | |
| 7,047,343 B2 | 5/2006 | Shaw | |
| 7,051,218 B2 | 5/2006 | Gulick et al. | |
| 7,069,347 B1* | 6/2006 | Kolokowsky | 710/8 |
| 7,072,989 B1 | 7/2006 | Kolokowsky et al. | |
| 7,086,583 B2 | 8/2006 | Wurzburg | |
| 7,134,027 B2 | 11/2006 | Calhoon | |
| 7,149,888 B1 | 12/2006 | Hart et al. | |
| 7,170,259 B2 | 1/2007 | Veselic | |
| 7,194,638 B1 | 3/2007 | Larky | |
| 7,207,014 B2 | 4/2007 | Velasco et al. | |
| 7,210,619 B2 | 5/2007 | Wurzburg | |
| 7,219,240 B2 | 5/2007 | O | |
| 7,271,568 B2 | 9/2007 | Purdy et al. | |
| 7,310,697 B2 | 12/2007 | Pandit et al. | |
| 7,325,733 B2 | 2/2008 | Wurzburg et al. | |
| 7,340,627 B1 | 3/2008 | Harvey | |
| 7,346,728 B1 | 3/2008 | Jackson | |
| 7,373,528 B2 | 5/2008 | Schindler | |
| 7,421,594 B2 | 9/2008 | Nakajima et al. | |
| 7,443,627 B1 | 10/2008 | Krishnamoorthy et al. | |
| 7,516,413 B2 | 4/2009 | Toh et al. | |
| 7,518,343 B2 | 4/2009 | Veselic et al. | |
| 7,523,338 B2 | 4/2009 | Fu et al. | |
| 7,624,202 B2 | 11/2009 | Monks et al. | |
| 7,631,111 B2 | 12/2009 | Monks et al. | |
| 2002/0155893 A1 | 10/2002 | Swanberg et al. | |
| 2003/0167345 A1 | 9/2003 | Knight et al. | |
| 2004/0027879 A1 | 2/2004 | Chang | |
| 2004/0078514 A1 | 4/2004 | Kung et al. | |
| 2004/0130505 A1 | 7/2004 | Lee et al. | |
| 2004/0221180 A1 | 11/2004 | Enami et al. | |
| 2004/0221181 A1 | 11/2004 | Yu | |
| 2004/0239294 A1 | 12/2004 | Veselic et al. | |
| 2004/0251878 A1 | 12/2004 | Veselic | |
| 2005/0144495 A1 | 6/2005 | Nakajima et al. | |
| 2005/0174094 A1 | 8/2005 | Purdy et al. | |
| 2006/0095641 A1 | 5/2006 | Pandit et al. | |
| 2006/0112288 A1 | 5/2006 | Schindler | |
| 2006/0181241 A1 | 8/2006 | Veselic | |
| 2006/0287007 A1 | 12/2006 | Veselic et al. | |
| 2007/0022311 A1 | 1/2007 | Park | |
| 2007/0088967 A1 | 4/2007 | Fu et al. | |
| 2007/0139705 A1 | 6/2007 | Ogiwara et al. | |
| 2007/0143505 A1 | 6/2007 | Terrell, II | |
| 2007/0143844 A1* | 6/2007 | Richardson et al. | 726/22 |
| 2007/0220287 A1 | 9/2007 | Sang-Heon | |
| 2009/0144469 A1 | 6/2009 | Brundridge et al. | |
| 2009/0307407 A1* | 12/2009 | Bennett | 710/316 |
| 2010/0084741 A1* | 4/2010 | Andres et al. | 257/536 |

FOREIGN PATENT DOCUMENTS

| | | |
|---|---|---|
| EP | 0982663 | 3/2000 |
| GB | 2352540 | 1/2001 |
| JP | 07-334633 | 12/1995 |
| JP | 408050643 | 2/1996 |
| JP | 2000-035837 | 2/2000 |
| JP | 2000-242377 | 9/2000 |
| JP | 2001-043178 | 2/2001 |
| JP | 2003-140784 | 5/2003 |
| JP | 2003-280775 | 10/2003 |
| KR | 10-2004-0008365 | 1/2004 |
| KR | 10-0490068 | 5/2005 |

OTHER PUBLICATIONS

"USB MulitSwitch Hub," SMSC: Success by Design, USB2524 Datasheet, Revision 1.2, Jul. 17, 2006, 57 pages.

"LM3658 Dual Source USB/AC Li Chemistry Charger IC for Portable Applications," National Semiconductor Corporation, May 2005, 14 pages.

Terry Remple, Megan Hayes, and Dave Wilson, "CEA-936-A USB Carkit Specification," Consumer Electronics Association (CEA) R6 Mobile Electronics Committee, Aug. 11, 2005, 97 pages.

Carlson, Brian, "SmartReflex power and performance management technologies—reduced power consumption, optimized performance", Texas Instruments—Technology for Innovators, 2005, 8 pages.

"Wireless Handsets," Texas Instruments—Technology for Innovators—TWL4030, http://focus.ti.com/general/docs/wtbu/wtbugencontent.tsp?templateId=6123&-contentId=4634&DCMP=WTBU&HQS=ProductBulletin+OT+twl4030, 2005, 2 pages. (Retrieved May 21, 2007).

"Programmable Multi-Host Device Sharing USB Hub," IBM Research Disclosure, vol. 418, No. 92, Feb. 1999, 1 page.

Compaq, et al., "Universal Serial Bus Specification: Revision 2.0," Apr. 27, 2000, pp. 21,32-33,60,65-66,80,156.

Compaq, et al., "Universal Serial Bus Specification: Revision 2.0," Apr. 27, 2000, pp. ii-iv, 25-26.

"PCI Bus Power Management Interface Specification: Revision 1.1," PCI: Local Bus, PCI Special Interest Group, Dec. 18, 1998, pp. 55-59.

Kris Fleming, "Power saving of using USB Selective Suspend Support Whitepaper," Intel Mobile Platforms Group: Version 0.6, May 20, 2003, pp. 1-7.

Advanced Configuration and Power Interface Specification, Compaq Computer Corporation, Intel Corporation, Microsoft Corporation, Phoenix Technologies Ltd., Toshiba Corporation, Revision 2.0c, Aug. 25, 2003, pp. 1-180.

Advanced Configuration and Power Interface Specification, Compaq Computer Corporation, Intel Corporation, Microsoft Corporation, Phoenix Technologies Ltd., Toshiba Corporation, Revision 2.0c, Aug. 25, 2003, pp. 181-488.

"The Laptop Computer May Be Unable to Enter the C3 Processor Power-Saving State," http://support.microsoft.com/default.aspx?scid=kbjen-us;297045, Article publication date is unknown, 2 pages. (Retrieved Apr. 19, 2006).

Prior Art Statement (2 pages); Feb. 2009.

* cited by examiner

METHODS AND SYSTEMS FOR INTERFACING BUS POWERED DEVICES WITH HOST DEVICES PROVIDING LIMITED POWER LEVELS

BACKGROUND

1. Field of the Invention

The present invention generally relates to connecting external devices with host devices and, more particularly, to connecting such devices through interfaces supporting limited power levels.

2. Related Art

As is well known, various types of interfaces may be used to facilitate data communication between host devices and external devices such as hard drives or other peripherals. Certain interfaces may also permit host devices to provide power (e.g., bus power) to external devices through the interface while also facilitating data communication with the external devices.

Such bus powered implementations are particularly desirable for users because they may reduce the number of cables connected between host devices and external devices. For example, a single interface cable may be used to provide bus power connections as well as data communication connections between a host device and an external device. As a result, the bus powered interface may permit a user to avoid having to separately connect the external device to an external power supply.

However, conventional bus powered interfaces typically limit the amount of power that is available through the interface. These limitations can significantly decrease the usefulness of such interfaces. For example, when a compatible external device is connected to a host device by a Universal Serial Bus (USB) 2.0 interface, the host device obtains parameters from the external device in accordance with an enumeration process to register the external device with the host device. During the enumeration process, typically only a low power level (e.g., 100 mA) is provided to the external device. After the external device is registered with the host device, a high power level (e.g., 500 mA) may be provided to operate the external device (e.g., in a fully active state). The USB 3.0 interface (e.g., also referred to as SuperSpeed USB) increases these low and high power levels to 150 mA and 900 mA, respectively.

Unfortunately, the initial low power levels provided during the USB enumeration process are often insufficient to operate external hard drives or other types of devices which require large current draws. For example, in order for a host device to receive parameters from an external hard drive during the enumeration process, it is typically necessary to spin up the hard drive to a normal operating speed in order to read the parameters from the hard drive. Although the high power levels supported by the USB 2.0 and 3.0 interfaces may be sufficient to operate the hard drive after it is registered with the host device, the initial low power levels provided during the enumeration process are often inadequate to reliably power up the hard drives in the manner necessary to read the hard drive.

As a result, users may be forced to power an external hard drive from an external power supply each time the hard drive is connected to the host device. These complications can defeat the purpose of the bus power provided through the interface and frustrate the efforts of manufacturers to provide reliable external devices that may be operated exclusively on bus power. Accordingly, there is a need for an improved approach to interfacing bus powered external devices with host devices.

SUMMARY

Various techniques are provided for interfacing bus powered devices with host devices providing limited power levels. For example, in one embodiment, a method of interfacing an external device with a host device through a bus is provided. The method includes connecting the external device to the bus. The bus is adapted to pass electrical power from the host device to the external device and further adapted to pass data communications between the host device and the external device. The method also includes receiving a first power level at the external device from the host device through the bus. A hard drive of the external device does not operate while the first power level is received by the external device. The method further includes retrieving a set of device parameters from a nonvolatile memory of the external device. The device parameters identify the hard drive. In addition, the method includes providing the device parameters from the external device to the host device through the bus to register the external device with the host device. The method also includes receiving a second power level at the external device from the host device through the bus to operate the hard drive after the external device is registered with the host device using the device parameters.

In another embodiment, an external device is adapted to interface with a host device through a bus. The external device includes a port adapted to connect to the bus. The port is adapted to receive a first power level from the host device through the bus before the external device is registered with the host device. The port is also adapted to receive a second power level from the host device through the bus after the external device is registered with the host device. The port is further adapted to pass data communications between the host device and the external device through the bus. The external device also includes a hard drive. The hard drive is adapted to not operate while the first power level is received from the host device through the bus. The hard drive is also adapted to operate while the second power level is received from the host device through the bus. The external device further includes a nonvolatile memory adapted to selectively store device parameters that identify the hard drive. In addition, the external device includes a controller. The controller is adapted to retrieve the device parameters from the nonvolatile memory. The controller is also adapted to provide the device parameters from the external device to the host device through the port to register the external device with the host device.

In another embodiment, an external device is adapted to interface with a host device through a bus. The external device includes means for connecting the external device to the bus. The bus is adapted to pass electrical power from the host device to the external device. The bus is also adapted to pass data communications between the host device and the external device. The external device also includes means for receiving a first power level at the external device from the host device through the bus. An electrical component of the external device does not operate while the first power level is received by the external device.

The external device further includes means for storing a set of device parameters. The device parameters identify the electrical component. In addition, the external device includes means for retrieving the device parameters from the storing means. The external device also includes means for providing the device parameters from the external device to the host device through the bus to register the external device with the host device. The external device further includes means for receiving a second power level at the external device from the host device through the bus to operate the electrical component after the external device is registered with the host device using the device parameters.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

In accordance with embodiments further discussed herein, various techniques are provided for interfacing external devices with host computer systems. For example, hard drive parameters may be selectively stored in a nonvolatile memory of an external hard drive enclosure device. The hard drive parameters may be provided from the nonvolatile memory to the host device in order to register the external device with the host device as part of an enumeration process while the host device provides a low power level to the external device. Following registration of the external device, the host device may provide a high power level to the external device in order to operate the registered external device.

In one embodiment, the hard drive parameters may be stored in the nonvolatile memory by a provider (e.g., a manufacturer, distributor, or other appropriate entity) of the external device. In this embodiment, the particular type of hard drive included in the external device will be known by the provider. As a result, the provider may store the relevant hard drive parameters in the nonvolatile memory before the external device is received by a user.

In another embodiment, the particular type of hard drive used by the external device will not be known by the provider before the external device is received by the user. For example, the hard drive may be selected and installed by the user or another entity. As a result, the hard drive parameters may not be initially stored in nonvolatile memory. Instead, the hard drive parameters may be loaded into the nonvolatile memory by appropriate software running on the host device.

In another embodiment, the external device may provide parameters to the host device in order to emulate another external device (e.g., a mass storage device or other appropriate device) and register the emulated device with the host device. Following registration of the emulated device, the host device may provide a high power level to the external device. The external device may use the high power level to read parameters from the hard drive and store such parameters in the nonvolatile memory of the external device. The external device may then request disconnection from the host device, receive the low power level from the host device, and provide the stored parameters (e.g., corresponding to the actual parameters associated with the hard drive) to the host device while powered from the low power level. The host device may re-register the external device using the new parameters and subsequently provide the high power level to the external device to operate the hard drive.

These and other embodiments are further described herein with reference to external hard drives and hard drive enclosure devices. However, these techniques may be applied to any appropriate type of external device such as, for example, user interface devices, communication devices, printers, other data storage devices, or other types of external devices.

Figure 1:
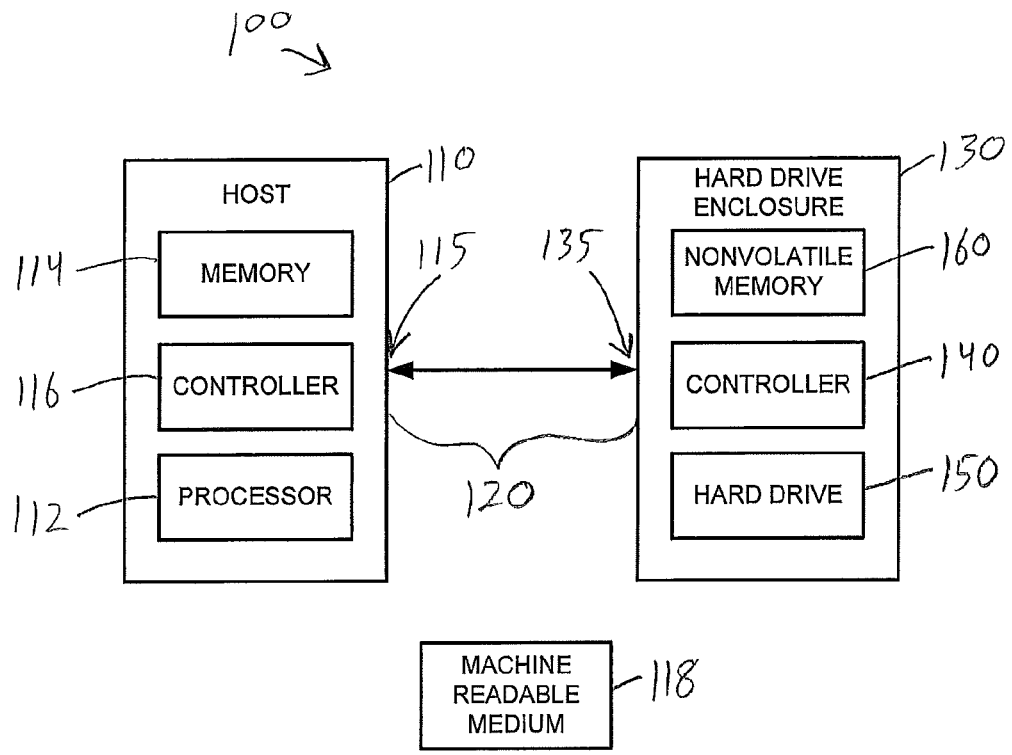
FIG. 1 illustrates a system including a host device and an external hard drive enclosure device in accordance with an embodiment of the invention.

Referring now to the drawings which are provided for purposes of illustrating embodiments of the invention, and not for purposes of limiting the same, FIG. 1 illustrates a system 100 including a host device 110 and an external hard drive enclosure device 130 in accordance with an embodiment of the invention. Host device 110 may be any type of device configured to interface with external device 130 through a bus 120. For example, in one embodiment, host device 110 may be a programmable computer system as shown in FIG. 1. In another embodiment, host device 110 may be implemented by dedicated hardware.

In the embodiment illustrated in FIG. 1, host device 110 includes a processor 112, a memory 114, and a controller 116. Processor 112 may be configured with appropriate software (e.g., a computer program for execution by processor 112) that is stored on a machine readable medium 118 (e.g., a CD-ROM or other appropriate medium) and/or in memory 114 to instruct processor 112 to perform one or more of the operations described herein with regard to host device 110.

Controller 116 may be implemented to support data communication and provide power to external device 130 through bus 120. In various embodiments, bus 120 may be implemented to support a USB 2.0 interface, a USB 3.0 interface, a Firewire interface (e.g., an IEEE 1394 interface), or other appropriate interface. Accordingly, it will be appreciated that bus 120 may be implemented as a cable including wires for passing data communications between host device 110 and external device 130, and including additional wires for providing bus power from host device 110 to external device 130. Also, host device 110 and external device 130 may include appropriate ports 115 and 135, respectively, to connect to bus 120.

External device 130 includes a controller 140, a hard drive 150, and a nonvolatile memory 160. Controller 140 may be implemented to support data communication between host device 110 and hard drive 150 through bus 120 in accordance with the various types of interfaces described above with regard to bus 120.

Hard drive 150 may interface with controller 140 which facilitates communication between hard drive 150 and host device 110. Power received through bus 120 may be provided to hard drive 150. Although a single hard drive 150 is shown in FIG. 1, any desired number of hard drives 150 may be provided.

Hard drive 150 may be implemented in accordance with various types of hard drives known in the art. For example, in one embodiment, hard drive 150 is a removable hard drive which may be selectively inserted and removed from external device 130 by a user. In another embodiment, hard drive 150 is fixed in external device 130. In yet another embodiment, hard drive 150 may be included in external device 130 at the time external device 130 is manufactured (e.g., hard drive 150 may be included by a provider of external device 130). In a further embodiment, hard drive 150 may be provided separately from enclosure 150 (e.g., hard drive 150 may be provided separately by a user).

Nonvolatile memory 160 may be used to store parameters of hard drive 150 which may be passed by controller 140 to host device 110 to register hard drive 150 with host device 110 as further described herein. Nonvolatile memory 160 may be implemented in accordance with various types of nonvolatile memories known in the art such as flash memory, Electrically Erasable Programmable Read-Only Memory (EEPROM), or other appropriate types of memory.

Figure 2:
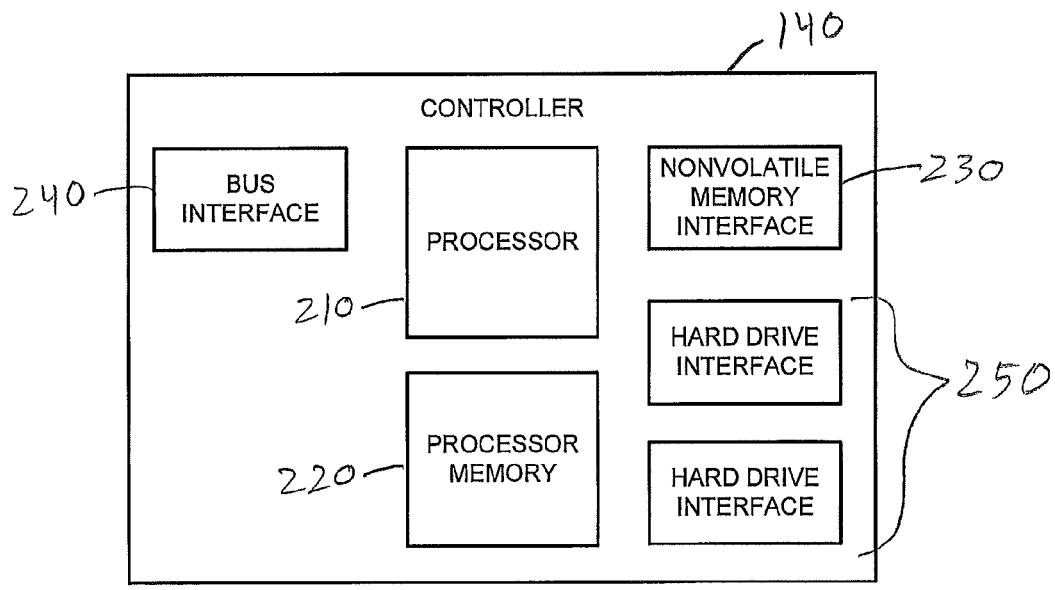
FIG. 2 illustrates a controller of an external hard drive enclosure device in accordance with an embodiment of the invention.

FIG. 2 illustrates controller 140 of external device 130 in accordance with an embodiment of the invention. Controller 140 includes a processor 210, a processor memory 220, a nonvolatile memory interface 230, a bus interface 240, and hard drive interfaces 250.

Processor 210 may be configured with appropriate software (e.g., a computer program for execution by processor 210) that is stored on machine readable medium 118, in nonvolatile memory 160, and/or in processor memory 220 to instruct processor 210 to perform one or more of the operations described herein with regard to controller 140.

Nonvolatile memory interface 230 may be used by processor 210 for interfacing with nonvolatile memory 160 to store data to, and retrieve data from, nonvolatile memory 160. Such data may include, for example, parameters of hard drive 150 and/or instructions for execution by processor 210. Bus interface 240 may be used by processor 210 to facilitate communication between processor 210 and controller 116 of host device 110 through bus 120.

Hard drive interfaces 250 may be used by processor 210 to communicate with one or more hard drives 150. Although two hard drive interfaces 250 are shown in FIG. 2, it will be appreciated that any desired number of hard drive interfaces 250 may be provided. Hard drive interfaces 250 may be implemented in accordance with any appropriate type of hard drive interface such as, for example, Serial Advanced Technology Attachment (SATA) interfaces, external SATA (eSATA) interfaces, Parallel Advanced Technology Attachment (PATA) interfaces, or other types of interfaces as may be desired in particular implementations.

Figure 3:
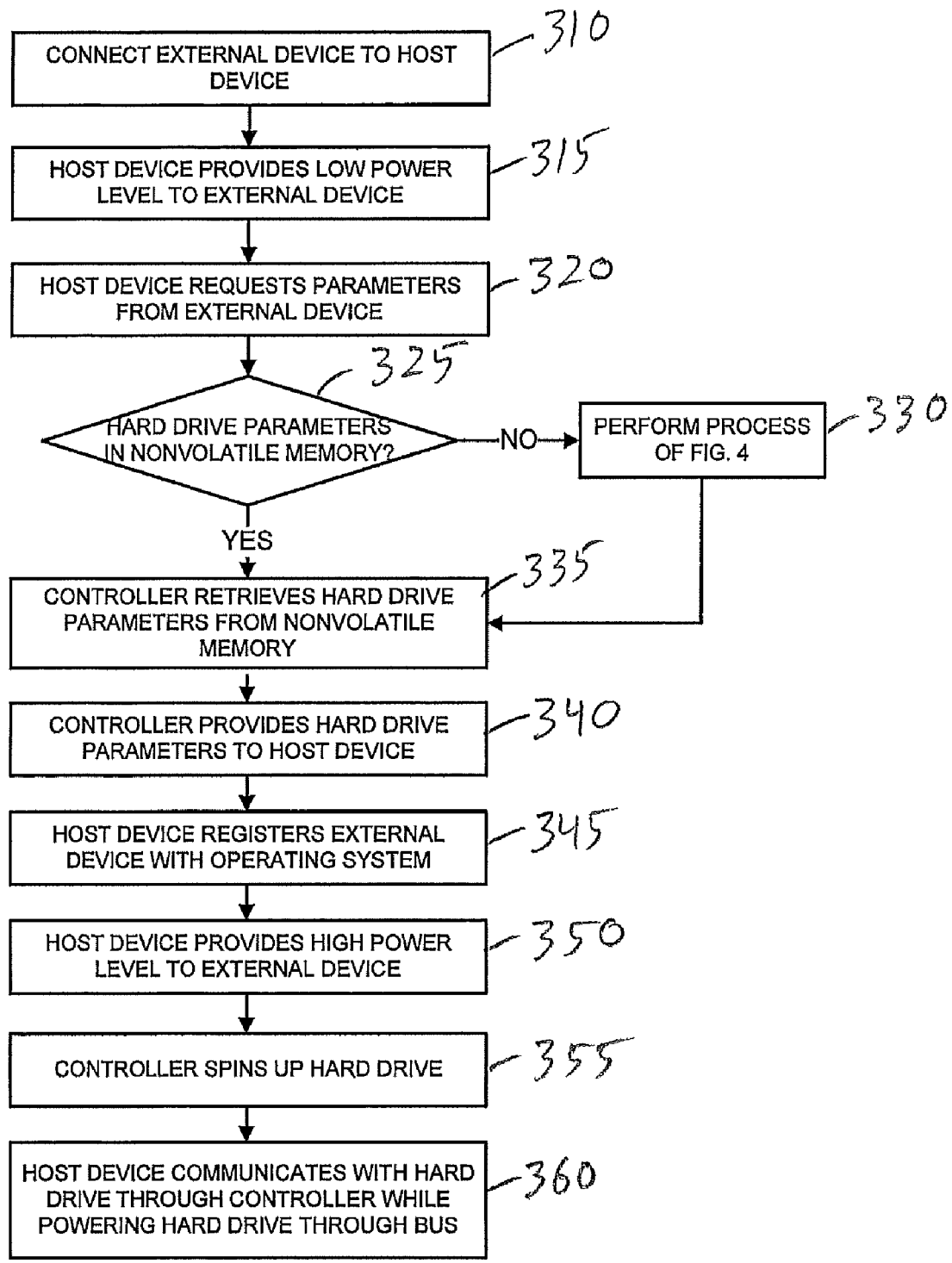
FIG. 3 illustrates a process of interfacing an external hard drive enclosure device with a host device in accordance with an embodiment of the invention.

FIG. 3 illustrates a process of interfacing external device 130 with host device 110 in accordance with an embodiment of the invention. In initial step 310, external device 130 is physically connected to host device 110 by bus 120. For example, in one embodiment, an appropriate interface cable (e.g., a USB or Firewire cable) may be connected between ports 115 and 135 of external device 130 and host device 110 to provide bus 120.

In step 315, host device 110 detects the connection of external device 130 and provides a low power level to external device 130 through bus 120. This low power level may be used to initially power up certain components of external device 130 from an initial unpowered state. For example, in one embodiment, controller 140 and nonvolatile memory 160 may be powered up in response to step 315 while hard drive 150 remains in an unpowered state (e.g., hard drive does not operate while the low power level is received by external device 130). As a result, controller 140 may read appropriate operating instructions from nonvolatile memory 160 into processor memory 220 for execution by processor 210. In embodiments where bus 120 supports a USB 2.0 or USB 3.0 interface, the low power level provided in step 315 may be approximately 100 mA or 150 mA.

In step 320, host device 110 begins an enumeration process in order to register external device 130 with host device 110. Accordingly, during step 320, host device 110 requests device parameters from external device 130. For example, in one embodiment, host device 110 may issue an enumeration request to external device 130 during step 320.

The parameters requested during step 320 may be used by host device 110 to register external device 130 with host device 110. For example, in one embodiment, the parameters may identify a disk size, sector size, logical unit numbers (LUNs), and/or other information which may be used by host device 110 to register external device 130. In another embodiment, the parameters may be endpoint parameters that identify the type of external device 130 connected to host device 110. For example, such endpoint parameters may identify external device 130 as a mass storage device. In another example, the endpoint parameters may identify that external device 130 supports one or more mass storage class protocols such as Bulk-Only Transport (BOT) and USB-attached-SCSI (UASP). In yet another example, the endpoint parameters may identify the number of endpoints supported, the size of FIFOs/buffers, and power requirements of external device 130.

Figure 4:
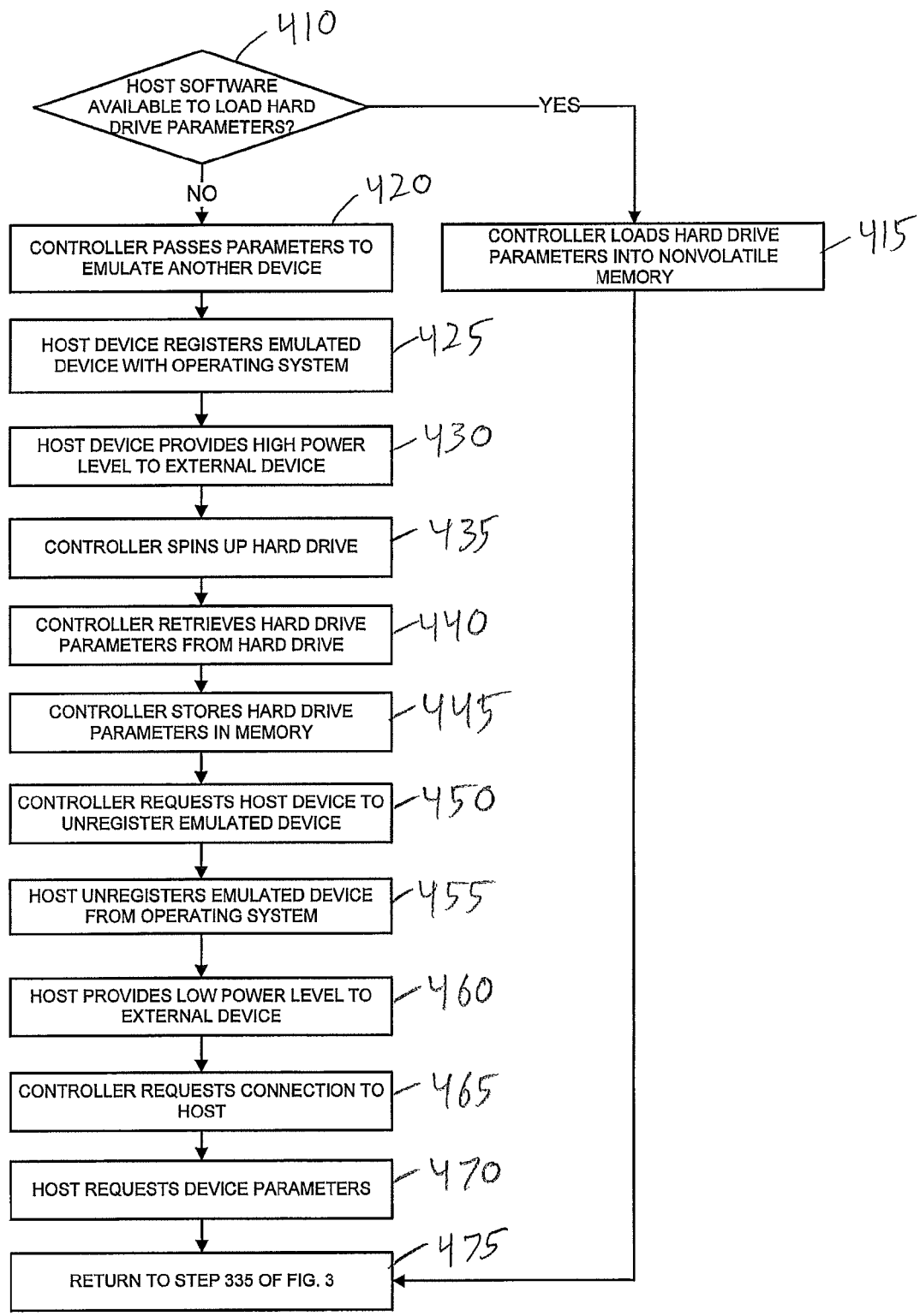
FIG. 4 illustrates a process of storing hard drive parameters in a memory of an external hard drive enclosure device in accordance with an embodiment of the invention.

In step 325, controller 140 receives the request provided by host device 110 and determines whether the requested device parameters are stored in nonvolatile memory 160. If the requested device parameters are stored in nonvolatile memory 160, then the process continues to step 335. Otherwise, the process continues to step 330 wherein the process of FIG. 4 is performed as further described herein. In this regard, it will be appreciated that hard drive 150 may be provided with external device 130 or may be separately provided by a user as previously described herein.

For example, in one embodiment, the particular type of hard drive 150 used by external device 130 will be known by the provider of external device 130 before external device 130 is received by a user. Thus, in such an embodiment, the provider may store the hard drive parameters in nonvolatile memory 160 before external device 130 is received by a user. As a result, controller 140 may determine that the hard drive parameters are stored in nonvolatile memory 160 (step 325). In this case, the process continues to step 335.

In another embodiment, the particular type of hard drive 150 used by external device 130 will not be known by the provider of external device 130. For example, hard drive 150 may be selected and installed by the user or another entity. As a result, the relevant hard drive parameters may not be stored in nonvolatile memory 160 in such an embodiment. As a result, controller 140 may determine that the hard drive parameters are not stored in nonvolatile memory 160 (step 325). In this case, the process continues to step 330 wherein the process of FIG. 4 is performed as further described herein.

In step 335, controller 140 retrieves the hard drive parameters from nonvolatile memory 160. Then, in step 340, controller 140 provides the hard drive parameters to host device 110 through bus 120.

In step 345, host device 110 registers external device 130 with an operating system running on processor 112 of host device 110 and thus completes the enumeration process that was initiated in previous step 320.

In step 350, host device 110 provides a high power level to external device 130. This high power level may be used to continue powering controller 140 and nonvolatile memory 160 of external device 130, and may also be used to power up hard drive 150 from a previously unpowered state (e.g., non-operational state). In embodiments where bus 120 supports a USB 2.0 or USB 3.0 interface, the high power level provided in step 350 may be approximately 500 mA or 900 mA. As a result, in step 355, controller 140 powers up hard drive interfaces 250 and hard drive 150. This causes hard drive 150 to turn on and spin up to a normal operating speed in order to support read and write operations.

Thereafter, in step 360, host device 110 communicates with hard drive 150 through bus 120 using controller 140. For example, host device 110 may perform read and write operations with hard drive 150 in accordance with appropriate instructions executed by processor 112 of host device 110. Also during step 360, host device 110 continues to provide power to hard drive 150 through bus 120. Thus, hard drive 150 may continue to operate on bus power provided by host device 110 without requiring a separate external power source connection.

FIG. 4 illustrates a process of storing hard drive parameters in nonvolatile memory 160 of external device 130 in accordance with an embodiment of the invention. As previously described, the process of FIG. 4 may be performed during step 330 of FIG. 3 if the external device parameters requested by host device 130 in step 320 are not stored in nonvolatile memory 160.

Various techniques may be used to store the hard drive parameters in nonvolatile memory 160. For example, in one embodiment, software that includes the hard drive parameters may be provided to host device 110. Such software may be provided on machine readable medium 118, downloaded by host device 110 through an appropriate network connection, or otherwise provided to host device 110. If such software is available (step 410), then the process of FIG. 4 continues to step 415. Otherwise, the process continues to step 420.

In step 415, processor 112 of host device 110 runs the software and loads (e.g., stores) the hard drive parameters into nonvolatile memory 160 from host device 110 through bus 120 by sending appropriate load commands and data packets through bus 120. In one embodiment, host device 110 may interface directly with nonvolatile memory 160. In another embodiment, host device 110 may interface with nonvolatile memory 160 through controller 140. After the hard drive parameters are loaded into nonvolatile memory, the process of FIG. 4 continues to step 475 where it returns to step 335 of FIG. 3.

In another embodiment, the hard drive parameters may be read from hard drive 150 by controller 140 while external device 130 emulates another device capable of receiving a high power level from host device 110. For example, in step 420 (e.g., assuming that hard drive parameters have not been loaded into nonvolatile memory 160 from host device 110), controller 140 may provide emulated device parameters to host device 110 that identify external device 130 as any type of device capable of receiving a high power level from host device 110. For example, in one embodiment, controller 140 may provide emulated device parameters that identify external device 130 as a mass storage device connected by a USB 2.0 or 3.0 interface. In another embodiment, such parameters may identify external device 130 as a device currently configured in a firmware-upload mode.

It will be appreciated that during step 420, the enumeration process previously initiated in step 320 is still in progress. Specifically, host device 110 will be waiting to receive the external device parameters requested in step 320. Thus, during step 420, controller 140 may provide the emulated device parameters to host device 110 in response to the request of step 320.

In step 425, host device 110 registers external device 130 with an operating system running on processor 112 of host device 110 in accordance with the emulated device parameters provided in step 420. For example, in the embodiments described above, host device 110 will register external device 130 as a mass storage device or an external device configured in a firmware-upload mode. This registration of the emulated external device thus completes the enumeration process that was initiated in previous step 320.

In step 430, host device 110 provides a high power level to external device 130 as previously described with regard to step 350. Because the high power level is now provided by host device 110, external device 130 will receive sufficient power to operate hard drive 150. Therefore, in step 435, controller 140 causes hard drive 150 to turn on and spin up to a normal operating speed.

Following step 435, hard drive 150 may perform read and write operations in response to commands received from controller 140. Accordingly, in step 440, controller 140 retrieves hard drive parameters from hard drive 150. For example, in one embodiment, such parameters may be stored in a readable portion of the storage medium provided by hard drive 150. Thus, in step 440, controller may perform a read operation on hard drive 150 to read the hard drive parameters.

In step 445, controller 140 stores the hard drive parameters in nonvolatile memory 160. It will be appreciated that, following step 445, hard drive parameters stored in nonvolatile memory 160 may be retrieved by controller 140 in response to requests received from host device 120. As a result, controller 140 attempts to unregister the emulated version of external device 130 and re-register external device 130 using the stored hard drive parameters.

Accordingly, in step 450, controller 140 requests host device 110 to unregister (e.g., disconnect) the emulated version of external device 130. In response, host device 110 unregisters the emulated version of external device 130 from the operating system running on processor 112 in step 455. After the emulated version of external device 130 is unregistered, host device 110 switches to providing the previously identified low power level to external device 130 in step 460.

In step 465, controller 140 requests host device 110 to register (e.g., connect) external device 130. In response, host device 110 begins a new enumeration process in order to register external device 130 with host device 110. Accordingly, during step 470, host device 110 requests device parameters from external device 130 as previously described with regard to step 320.

The process of FIG. 4 then continues to step 475 where it returns to step 335 of FIG. 3. In this regard, it will be appreciated that during the subsequent performance of step 335, controller 140 retrieves the hard drive parameters that were stored in step 445 of FIG. 4 to facilitate the registration of external device 130 using the correct parameters corresponding to hard drive 150.

In view of the above disclosure, it will be appreciated that various techniques have been provided for interfacing external hard drives and external hard drive enclosure devices with host computer systems. These techniques may be applied to the interfacing of any type of external device including one or more electrical components which may be connected to a host device by a bus providing bus power and data communication.

For example, in one embodiment, parameters associated with an electrical component (e.g., an electrical device or portion of an electrical device) of an external device may be provided from a nonvolatile memory to a host device in order to register the external device with the host device as part of an enumeration process while the host device provides a low power level to the external device. Following registration of the external device, the host device may provide a high power level to the external device in order to operate the electrical component of the registered external device. The various storage techniques, emulation techniques, and other techniques described herein may also be used in such an embodiment.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Also, where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of interfacing an external device with a host device through a bus, the method comprising:
   receiving a first power level at the external device from the host device through the bus, wherein the bus is configured to provide electrical power from the host device to the external device and further configured to provide data communications between the host device and the external device, wherein a hard drive of the external device does not operate while the first power level is received by the external device;
   retrieving a set of device parameters from a nonvolatile memory of the external device, wherein the device parameters identify the hard drive;
   providing the device parameters from the external device to the host device through the bus to register the external device with the host device, wherein said providing the device parameters is performed after said receiving the first power level and after said retrieving the set of device parameters, wherein said providing the device parameters allows the external device to receive a second power level that is higher than the first power level; and
   receiving the second power level at the external device from the host device through the bus to operate the hard drive after the external device is registered with the host device using the device parameters.

2. The method of claim 1, further comprising performing the following prior to retrieving the device parameters:
   receiving the device parameters from the host device through the bus; and
   storing the device parameters in the nonvolatile memory.

3. The method of claim 1, wherein the external device is a first external device, the method further comprising performing the following prior to retrieving the device parameters:
   emulating a second external device to receive the second power level at the first external device from the host device through the bus to operate the hard drive;
   retrieving the device parameters from the hard drive while receiving the second power level at the first external device from the host device through the bus; and
   storing the device parameters in the nonvolatile memory.

4. The method of claim 3, wherein the emulated second external device is a mass storage device.

5. The method of claim 1, wherein the set of device parameters is a first set of device parameters, wherein the external device is a first external device, the method further comprising performing the following prior to retrieving the first set of device parameters:
   providing a second set of device parameters from the first external device to the host device to emulate a second external device, wherein the second device parameters identify the emulated second external device;
   receiving the second power level at the first external device from the host device through the bus to operate the hard drive after the emulated second external device is registered with the host device using the second device parameters;
   retrieving the first device parameters from the hard drive while receiving the second power level at the first external device from the host device through the bus; and
   storing the first device parameters in the nonvolatile memory.

6. The method of claim 5, further comprising performing the following prior to retrieving the first set of device parameters:
   requesting the host device to unregister the emulated second external device;
   receiving the first power level at the first external device from the host device through the bus;
   requesting the host device to register the first external device; and
   receiving a request for the first device parameters from the host device through the bus.

7. The method of claim 1, wherein the bus is configured to support a Universal Serial Bus (USB) 2.0 interface, the first power level is approximately 100 mA, and the second power level is approximately 500 mA.

8. The method of claim 1, wherein the bus is configured to support a Universal Serial Bus (USB) 3.0 interface, the first power level is approximately 150 mA, and the second power level is approximately 900 mA.

9. The method of claim 1, wherein the bus is configured to support a Firewire interface.

10. The method of claim 1, wherein the external device is a hard drive enclosure device.

11. The method of claim 1, wherein the hard drive is selectively removable from the external device.

12. The method of claim 1, wherein the nonvolatile memory is a flash memory.

13. An external device coupled to a host device via a bus, the external device comprising:
   a port adapted to couple to the bus, wherein the port is configured to receive a first power level from the host device through the bus before the external device is registered with the host device, wherein the port is further configured to receive a second power level from the host device through the bus after the external device is registered with the host device, wherein the second power level is greater than the first power level, and wherein the port is further configured to pass data communications between the host device and the external device through the bus;

a hard drive configured to not operate while the first power level is received from the host device through the bus and operate while the second power level is received from the host device through the bus;

a nonvolatile memory configured to selectively store device parameters that identify the hard drive; and a controller configured to retrieve the device parameters from the nonvolatile memory and provide the device parameters from the external device to the host device through the port to register the external device with the host device, wherein the first power level is provided prior to the controlling the device parameters, and wherein the second power level is provided in response to the controller providing the device parameters.

14. The external device of claim 13, wherein the external device is configured to receive the device parameters from the host device through the bus and store the device parameters in the nonvolatile memory.

15. The external device of claim 13, wherein the external device is a first external device, wherein the first external device is configured to:
   emulate a second external device to receive the second power level from the host device through the bus to operate the hard drive;
   retrieve the device parameters from the hard drive while the second power level is received from the host device through the bus; and
   store the device parameters in the nonvolatile memory.

16. The external device of claim 15, wherein the emulated second external device is a mass storage device.

17. The external device of claim 13, wherein the set of device parameters is a first set of device parameters, wherein the external device is a first external device, wherein the first external device is configured to:
   provide a second set of device parameters to the host device to emulate a second external device, wherein the second device parameters identify the emulated second external device;
   receive the second power level from the host device through the bus to operate the hard drive after the emulated second external device is registered with the host device using the second device parameters;
   retrieve the first device parameters from the hard drive while the second power level is received from the host device through the bus; and
   store the first device parameters in the nonvolatile memory.

18. The external device of claim 17, wherein the first external device is configured to:
   request the host device to unregister the emulated second external device;
   receive the first power level from the host device through the bus;
   request the host device to register the first external device; and
   receive a request for the first device parameters from the host device through the bus.

19. The external device of claim 13, wherein the bus is configured to support a Universal Serial Bus (USB) 2.0 interface, wherein the first power level is approximately 100 mA, and wherein the second power level is approximately 500 mA.

20. The external device of claim 13, wherein the bus is configured to support a Universal Serial Bus (USB) 3.0 interface, wherein the first power level is approximately 150 mA, and wherein the second power level is approximately 900 mA.

21. The external device of claim 13, wherein the bus is configured to support a Firewire interface.

22. The external device of claim 13, wherein the external device is a hard drive enclosure device.

23. The external device of claim 13, wherein the hard drive is selectively removable from the external device.

24. The external device of claim 13, wherein the nonvolatile memory is a flash memory.

25. An external device coupled to a host device via a bus, the external device comprising:
   means for interfacing the external device with the bus, wherein the bus is configured to provide electrical power from the host device to the external device and wherein the bus is further configured to pass data communications between the host device and the external device;
   means for receiving a first power level at the external device from the host device through the bus, wherein an electrical component of the external device does not operate while the first power level is received by the external device;
   means for storing a set of device parameters, wherein the device parameters identify the electrical component;
   means for retrieving the device parameters from the storing means;
   means for providing the device parameters from the external device to the host device through the bus to register the external device with the host device, wherein said providing the device parameters is performed after receiving the first power level and after retrieving the device parameters, wherein said providing the device parameters allows the external device to receive a second power level that is higher than the first power level; and
   means for receiving the second power level at the external device from the host device through the bus to operate the electrical component after the external device is registered with the host device using the device parameters.

26. The external device of claim 25, further comprising means for receiving the device parameters from the host device through the bus.

27. The external device of claim 25, wherein the external device is a first external device, wherein the first external device further comprises:
   means for emulating a second external device to receive the second power level at the first external device from the host device through the bus to operate the electrical component;
   means for retrieving the device parameters from the electrical component while
   receiving the second power level at the first external device from the host device through the bus; and
   means for storing the device parameters in the nonvolatile memory.

28. The external device of claim 25, wherein the set of device parameters is a first set of device parameters, wherein the external device is a first external device, wherein the first external device further comprises:
   means for providing a second set of device parameters from the first external device to the host device to emulate a second external device, wherein the second device parameters identify the emulated second external device;

means for receiving the second power level at the first external device from the host device through the bus to operate the electrical component after the emulated second external device is registered with the host device using the second device parameters;

means for retrieving the first device parameters from the electrical component while receiving the second power level at the first external device from the host device through the bus; and means for storing the first device parameters in the non-volatile memory.

29. The external device of claim 28, wherein the first external device further comprises:

means for requesting the host device to unregister the emulated second external device;

means for receiving the first power level at the first external device from the host device through the bus;

means for requesting the host device to register the first external device; and means for receiving a request for the first device parameters from the host device through the bus.

\* \* \* \* \*